United States Patent
Zhang et al.

(10) Patent No.: US 11,002,128 B2
(45) Date of Patent: May 11, 2021

(54) GRAVITY ACCELERATION MEASUREMENT APPARATUS AND EXTRACTION METHOD IN A ROTATING STATE

(71) Applicant: Institute of Geology and Geophysics, Chinese Academy of Sciences, Beijing (CN)

(72) Inventors: Wenxiu Zhang, Beijing (CN); Wenxuan Chen, Beijing (CN); Qingyun Di, Beijing (CN); Jianguang Liu, Beijing (CN); Yuntao Sun, Beijing (CN); Yongyou Yang, Beijing (CN); Jian Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 131 days.

(21) Appl. No.: 15/553,558

(22) PCT Filed: Nov. 12, 2016

(86) PCT No.: PCT/CN2016/105547
§ 371 (c)(1),
(2) Date: Aug. 24, 2017

(87) PCT Pub. No.: WO2018/040288
PCT Pub. Date: Mar. 8, 2018

(65) Prior Publication Data
US 2018/0223646 A1 Aug. 9, 2018

(30) Foreign Application Priority Data
Aug. 29, 2016 (CN) .......................... 201610771602.6

(51) Int. Cl.
*E21B 47/0228* (2012.01)
*G01P 1/00* (2006.01)
(Continued)

(52) U.S. Cl.
CPC ........ *E21B 47/0228* (2020.05); *E21B 47/022* (2013.01); *E21B 47/024* (2013.01);
(Continued)

(58) Field of Classification Search
CPC ........................ E21B 47/02216; E21B 47/0228
See application file for complete search history.

(56) References Cited

U.S. PATENT DOCUMENTS

| 4,362,054 A | 12/1982 | Ringot |
| 2003/0183423 A1* | 10/2003 | Brazil ...................... E21B 7/04 175/61 |

(Continued)

FOREIGN PATENT DOCUMENTS

| CN | 101915061 A | 12/2010 |
| CN | 102066875 A | 5/2011 |

(Continued)

*Primary Examiner* — John E Breene
*Assistant Examiner* — Jeffrey C Morgan
(74) *Attorney, Agent, or Firm* — Novick, Kim & Lee, PLLC; Allen Xue

(57) ABSTRACT

An apparatus for measuring gravity acceleration of a drilling tool comprises sensors and a measurement circuit. The sensor comprises a three-axis gravity accelerometer, a reference measurement sensor and a temperature sensor. The three-axis gravity accelerometer measures acceleration component signals in three mutually orthogonal directions, and the reference measurement sensor generates a signal that varies with rotation and is not affected by vibration or shock to serve as a reference signal. The temperature sensor measures the temperature in the apparatus to compensate the temperature effect of the gravity accelerometers. The measurement circuit acquires output signals of the sensors and performs cross-correlation processing on the accelerometer components using the reference signal to extract gravity acceleration signals so as to eliminate centrifugal acceleration, vibration, shock and other interferences generated by rotation. The non-interference gravity acceleration signals is used for calculating an inclination angle and a toolface angle of a drilling tool in the rotating state.

11 Claims, 3 Drawing Sheets

(51) Int. Cl.
    *G01C 21/16*     (2006.01)
    *G01P 15/18*     (2013.01)
    *E21B 47/022*    (2012.01)
    *E21B 47/024*    (2006.01)
    *E21B 47/07*     (2012.01)

(52) U.S. Cl.
    CPC .............. *E21B 47/07* (2020.05); *G01C 21/16* (2013.01); *G01P 1/006* (2013.01); *G01P 15/18* (2013.01)

(56) References Cited

U.S. PATENT DOCUMENTS

| | | | |
|---|---|---|---|
| 2005/0126287 A1* | 6/2005 | Malametz | G01P 15/08 |
| | | | 73/504.12 |
| 2005/0268476 A1* | 12/2005 | Illfelder | E21B 47/022 |
| | | | 33/313 |
| 2010/0145620 A1 | 6/2010 | Georgi et al. | |
| 2013/0151157 A1 | 6/2013 | Brooks et al. | |
| 2018/0045850 A1* | 2/2018 | Smidth | G01V 7/06 |

FOREIGN PATENT DOCUMENTS

| | | |
|---|---|---|
| CN | 102425409 A | 4/2012 |
| CN | 104453857 A | 3/2015 |
| CN | 104500036 A | 4/2015 |
| CN | 105180889 A | 12/2015 |
| CN | 206091970 U | 4/2017 |
| WO | 2010091239 A2 | 8/2010 |

* cited by examiner

GRAVITY ACCELERATION MEASUREMENT APPARATUS AND EXTRACTION METHOD IN A ROTATING STATE

FIELD OF THE INVENTION

The present invention mainly belongs to the field of measurement while drilling for petroleum drilling, and specifically relates to a gravity acceleration measurement apparatus and extraction method in a rotating state.

BACKGROUND OF THE INVENTION

Measurement While Drilling (MWD) refers to a process of measuring well trajectory parameters in real time and transmitting information to the surface by using drilling fluid, electromagnetic waves and the like as media in a drilling process. A MWD instrument likes the eyes of a directional drilling engineer and is an indispensable tool for controlling the well trajectory. In a directional drilling process, direction information of a drill bit is essential for correct drilling, accurate measurement of the direction of the drill bit can not only ensure efficient drilling for a specified target, but also avoid a risk of collision with adjacent wells. Therefore, in addition to the traditional bottom hole assembly (including a drill bit, a positive displacement motor, centralizers, drill collars, etc.), a directional drilling tool needs to use position sensors to measure downhole tool attitudes, including an azimuth angle (a drift angle on the horizontal plane with respect to the north), an inclination angle (the drift angle with respect to the vertical direction, also known as an inclination angle) and a toolface angle (equivalent to a roll angle in navigation), these position sensors and sensors for detecting the drilling engineering parameters (pressure, vibration, torque, etc.) jointly constitute a MWD system, which is installed in a non-magnetic drill collar about 10 meters away from the drill bit. The existing MWD system uses three accelerometers to measure the inclination angle and the toolface angle, and uses a three-axis fluxgate magnetometer to measure the azimuth angle in combination with the information of the inclination angle and the toolface angle measured by the accelerometers.

The existing MWD system must stop drilling for measurement, the whole drill string is static in the measurement process except for the mud circulation, this measurement mode has the advantages that the influence of rotation, vibration, shock and other factors of the drilling tool on the measurement results of the accelerometers is very small, which is conducive to improving the measurement accuracy. However, the disadvantages are that only intermittent measurement can be performed after a certain distance, measurement is generally performed once every 30 meters in actual engineering applications, the well trajectory between the measurement points can only be calculated by a mathematical method, and thus accurate well trajectory information cannot be obtained. Meanwhile, due to static measurement, the drilling operation must be stopped frequently, especially in a directional section, the drilling efficiency is seriously affected, the borehole wall stability is also affected due to the stop of the drilling, a very large torque needs to be borne in a re-rotation process of the drill string after the measurement is completed, which brings a series of problems to the drilling safety. In recent years, horizontal well development for shale gas and other unconventional oil and gas resources, latter-stage fine exploration for mature oilfield development, and the development of thin and ultra-thin layer (less than 1 meter) oil and gas reservoirs have higher and higher requirements on the well trajectory control accuracy, and the mode of intermittent measurement with drilling stopped of the existing MWD can hardly meet the requirements.

There is a conflict between the number of trajectory measurement points and the measurement efficiency of the existing MWD system, and dynamic and continuous measurement of the well trajectory has become the development trend of directional drilling measurement. For example, in a near-bit, the inclination angle MWD tool and a rotary steerable tool proposed in recent years, a three-axis gravity accelerometer is installed at positions near the drill bit to measure the inclination angle and the toolface angle, but the measurement accuracy still has a difference from that of the conventional MWD. This is because the strong vibration and strong shock downhole environment generated by the high-speed rotation of the drilling tool, cutting of rocks by the drill bit and the friction and collision between the drill string and the borehole wall brings strong interference to the measurement of the gravity acceleration in the drilling process, and a centrifugal acceleration, a vibration acceleration and a shock acceleration are superimposed on the gravity acceleration for output, therefore how to extract the gravity acceleration effectively in the interference environment is very important to improve the measurement accuracy of the inclination angle and the toolface angle.

SUMMARY OF THE INVENTION

In view of the above problems, the present invention provides a gravity acceleration measurement apparatus and extraction method in a rotating state, in which the interference of a centrifugal acceleration, a vibration acceleration and a shock acceleration with the gravity acceleration can be effectively suppressed in a rotating dynamic measurement process to realize the accurate extraction of the gravity acceleration so as to improve the measurement accuracy of an inclination angle and a tool face angle.

The present invention is realized by the following technical solutions:

A gravity acceleration measurement apparatus in a rotating state includes sensors and a measurement circuit, the sensors include a three-axis gravity accelerometer, a reference measurement sensor and a temperature sensor, the three-axis gravity accelerometer measures acceleration component signals in three mutually orthogonal directions, and the reference measurement sensor generates a signal that varies with rotation and is not affected by vibration or shock to serve as a reference signal; the temperature sensor measures temperature in the apparatus and the temperature is used for compensating the temperature effect of the gravity accelerometers and eliminating the temperature influence in downhole environment on the gravity accelerometers; and the measurement circuit acquires output signals of the sensors, respectively performs cross-correlation processing on the acceleration component signals subjected to the temperature compensation by using the reference signal, and eliminates centrifugal acceleration, vibration, shock and other interferences generated by rotation to obtain a non-interference gravity acceleration.

Further, the three-axis gravity accelerometer is three gravity accelerometers that are installed orthogonally to each other, one gravity accelerometer is installed along the axial direction of the drilling tool, the other two gravity accelerometers are installed along the radial direction of the drilling tool, and installation directions of three gravity accelerometers satisfy a right-handed coordinate system; the three-axis gravity accelerometer is connected with a lowpass filter, the lowpass filter performs analog filtering function for the output signals of the three-axis gravity accelerometer to remove higher frequency component of vibration and shock interferences than rotating frequency, the filtered signals are acquired by the measurement circuit, and the cut-off frequency of the lowpass filter is related to the frequency bandwidth of the three-axis gravity accelerometer and the rotating speeds of drilling tool.

Further, during the installation, an included angle between a sensitive axis of the reference measurement sensor and a rotating axis of the drilling tool is determined by the sensor type, so that when the drilling tool rotates, the reference measurement sensor can generate periodic changes in the direction of the sensitive axis.

Further, the measurement circuit further includes an analog-to-digital converter, a memory, a microcontroller and a data interface; the analog-to-digital converter is connected with the sensors and the microcontroller, and the microcontroller is connected with the memory and the data interface; the lowpass filter is connected between the analog-to-digital converter and the three-axis gravity accelerometer;

the analog-to-digital converter converts the filtered analog signals of the sensors into digital signals in a form format receivable by the controller;

the memory is an EEPROM or a FLASH, and the memory stores temperature calibration coefficients, scale factors, offset parameters and correction coefficients for installation error of the sensors; the controller performs calculation according to an algorithm to obtain the non-interference gravity acceleration; and the data interface is used for inputting and outputting data.

Further, the microcontroller is designed with a digital filter for filtering out an interference component of a Z-axis gravity accelerometer caused by vibration and shock.

Further, the gravity accelerometer is a quartz flexible accelerometer or a MEMS accelerometer; and the reference measurement sensor is any one or two or more of a magnetometer, a gyroscope and a photoelectric encoder;

the reference measurement sensor is the magnetometer used for measuring a magnetic field component variety generated by the rotation to serve as the reference signal;

or the reference measurement sensor is the gyroscope used for generating an angular velocity variety generated by the rotation and performing integration to obtain an angular displacement as the reference signal;

or the reference measurement sensor is the photoelectric encoder used for measuring an angular variety generated by the rotation to serve as the reference signal.

A gravity acceleration measurement and extraction method in a rotating state comprising: respectively measuring axial Z-axis and radial X-axis, Y-axis gravity accelerations of a drilling tool by using a three-axis acceleration sensor, and generating a signal that varies with rotation and is not affected by vibration or shock to serve as a reference signal by using a reference measurement sensor; measuring the temperature in the apparatus by using the temperature sensor, and performing temperature compensation on the gravity accelerometers; acquiring the output signals of the sensors by a measurement circuit, performing cross-correlation between the X-axis gravity acceleration and the Y-axis gravity acceleration measured by the three-axis gravity accelerometer and the normalized reference signal to eliminate the X-axis and Y-axis interference components generated by vibration and shock; and meanwhile designing a digital lowpass filter in the microcontroller to filter the interference component measured by the Z-axis gravity accelerometer, and finally obtaining a three-axis gravity acceleration in the rotating state with the influence of the vibration and shock eliminated.

Further, the gravity acceleration obtained by the method can be used for calculating an inclination angle and a toolface angle in the rotating state.

The present invention has the following beneficial technical effects:

1. the gravity acceleration signal can be effectively extracted from rotation, vibration and shock interferences, and thus the problem that the low-frequency component of vibration and shock signals than rotating frequency cannot be filtered by the traditional lowpass filtering extraction method is solved;

2. dynamic and continuous measurement can be realized, and the efficiency problem of the existing MWD system which needs to perform measurement under the condition of stopping drilling is overcome; and 3. the reference measurement sensor is added on the basis of the original gravity acceleration measurement, and the reference measurement sensor is flexible in installation mode and simple in structure.

The present invention can be used in MWD system, near-bit inclination angle measurement tool and rotary steerable system in the field of petroleum drilling, and can also be used on other application occasions in which the gravity acceleration needs to be dynamically measured in real time in the rotating state, such as inertial navigation.

DETAILED DESCRIPTION OF THE EMBODIMENTS

In order that the objectives, technical solutions and advantages of the present invention are clearer and more apparent, the present invention will be further described below in detail in combination with the drawings and embodiments. It should be understood that the specific embodiments described herein are merely used for explaining the present invention rather than limiting the present invention. On the contrary, the present invention encompasses any alternatives, modifications, equivalent methods and solutions made within the spirit and scope of the present invention as defined by the claims. Further, in order to make the public better understand the present invention, some specific details are described in detail in the following detailed description of the present invention. It should be understood by those skilled in the art that the present invention may also be fully understood without the description of the details.

Embodiment 1

Figure 1:
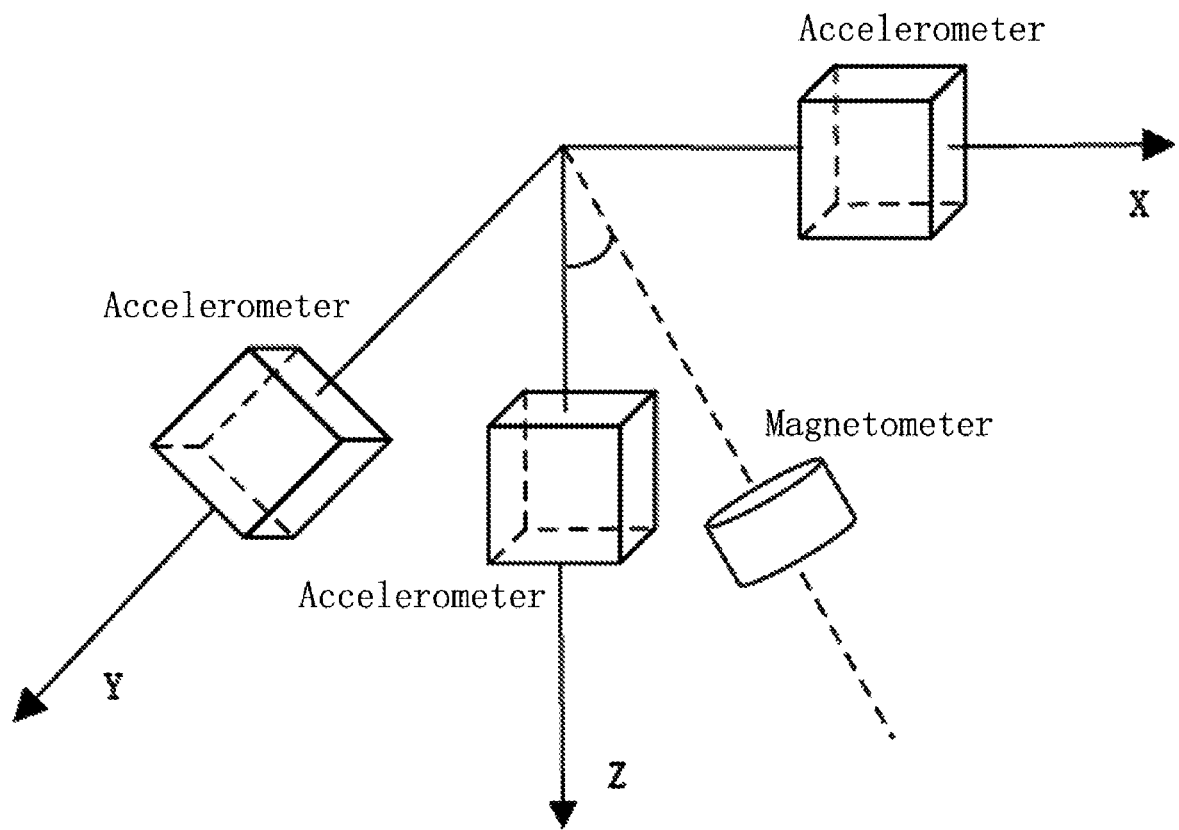
FIG. 1 is a schematic diagram of installation positions of a three-axis gravity acceleration sensor and a magnetometer in embodiment 1.
Figure 2:
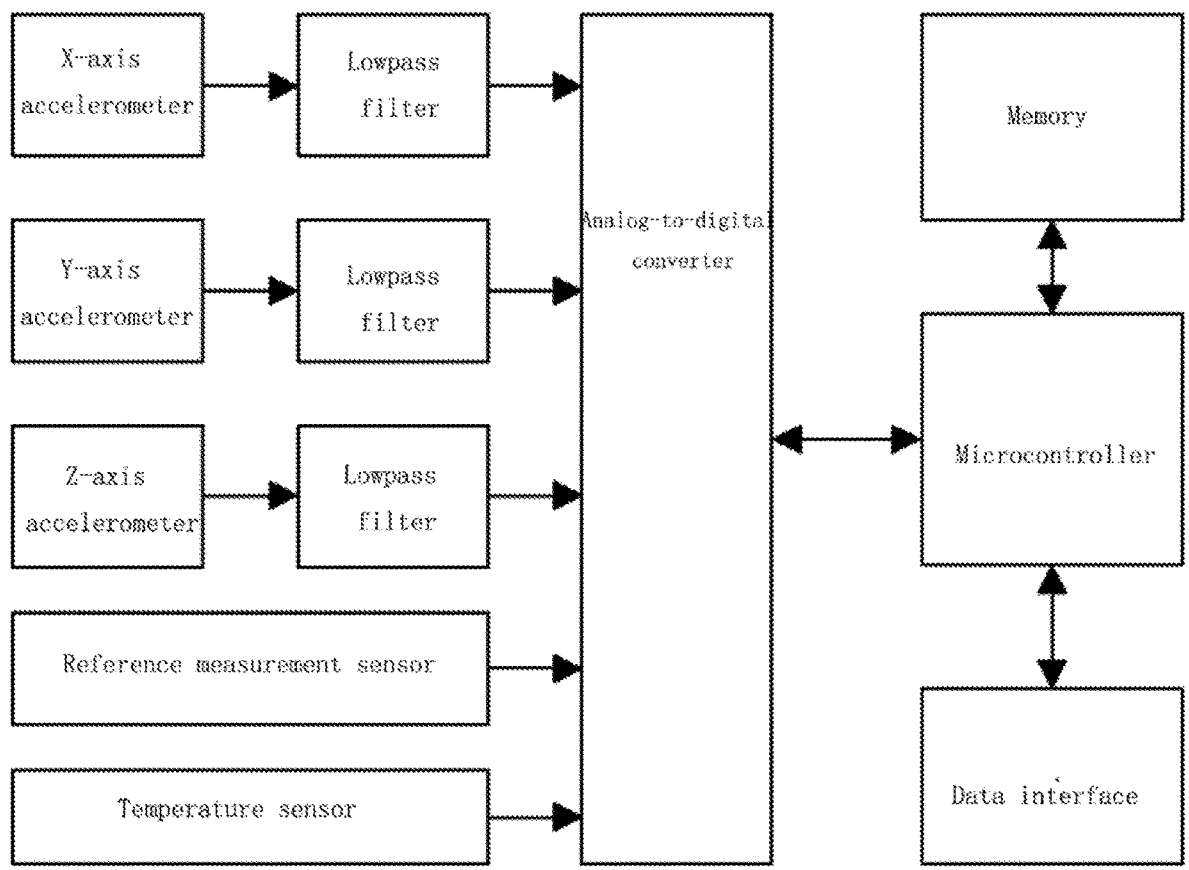
FIG. 2 is a schematic circuit diagram of a gravity acceleration measurement apparatus in a rotating state in embodiment 1.

A gravity acceleration measurement apparatus in a rotating state includes sensors and a measurement circuit, the sensors include three-axis gravity accelerometer, a reference measurement sensor and a temperature sensor, the three-axis gravity accelerometer is connected with a lowpass filter, an included angle between a sensitive axis of the reference measurement sensor and a rotating axis is determined by the sensor type, so that when a drilling tool rotates, the reference measurement sensor can generate periodic variety in the direction of the sensitive axis. The three-axis gravity accelerometer is installed orthogonally to each other, the Z-axis is arranged along the axial direction of the drilling tool, and X-axis and Y-axis are arranged along the radial direction of the drilling tool. The temperature sensor is installed close to the three-axis gravity accelerometer, a magnetometer is used as the reference measurement sensor, the sensitive axis of the magnetometer is parallel to the X-axis, and the installation mode is as shown in FIG. 1. The measurement circuit includes an analog-to-digital converter, a memory, a microcontroller and a data interface, and the connection mode of the apparatus is as shown in FIG. 2.

Figure 3:
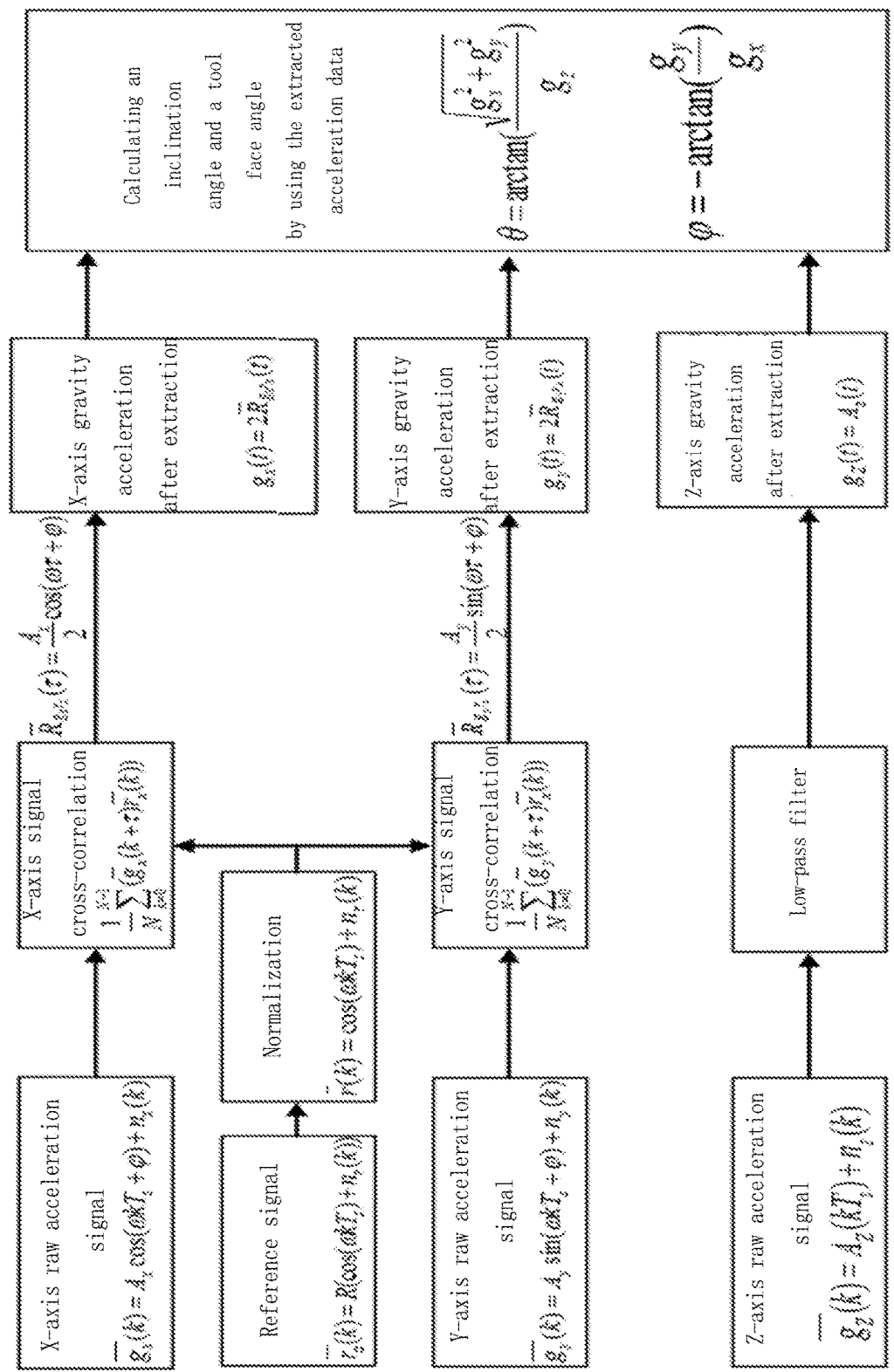
FIG. 3 is a schematic diagram of a gravity acceleration measurement method in a rotating state in embodiment 1.

The method for measuring the gravity acceleration in the rotating state by using the above apparatus is as follows: respectively measuring gravity accelerations of the drilling tool in axial direction Z and radial directions X and Y by using the three-axis gravity accelerometer, and generating a signal that varies with rotation and is not affected by vibration or shock to serve as a reference signal by using the reference measurement sensor; measuring the temperature in the apparatus by using the temperature sensor to perform temperature compensation on the gravity accelerometers; acquiring output signals of the sensors by the measurement circuit, performing cross-correlation on the X-axis gravity acceleration and the Y-axis gravity acceleration measured by the three-axis gravity accelerometer with the normalized reference signal to eliminate the interference components of the X-axis gravity acceleration and the Y-axis gravity acceleration generated by vibration and shock; and meanwhile designing the digital lowpass filter by the microcontroller to filter the interference component of the measurement of the Z-axis gravity accelerometer generated by vibration and shock, and finally obtaining a three-axis gravity acceleration in the rotating state with the influence of the vibration and shock eliminated. The non-interference gravity acceleration obtained by the measurement method can be used for calculating an inclination angle and a tool face angle of the drilling tool in the rotating state. The method is shown in FIG. 3

The gravity acceleration measurement and extraction method in the rotating state is specifically as follows:

(1) Acceleration Signal Measurement

The gravity acceleration measurement apparatus is installed on the drilling tool and rotates around the Z-axis together with the drilling tool while drilling, the rotating angular frequency of the drilling tool is set as $\omega=2\times\pi\times f$, the sampling frequency of the analog-to-digital converter is set as $$f_s = \frac{1}{T_s},$$

then the output signal of the acceleration sensor installed along the X-axis direction is:

$$\bar{g}_x(k)=A_x\cos(\omega\times k\times T_s+\varphi)+n_1(k)=g_x(k)+n_x(k) \quad (1)$$

$\bar{g}_x(k)$ represents an X-axis gravity acceleration signal that includes noise signals. $A_x$ represents the amplitude of the signal from the accelerator installed along the X-axis. k represents the sample point. $T_s$ is the sampling time interval, which is the inverse of the sampling frequency fs. $\omega$ is the angular speed, $\omega=2\times\pi\times f$, wherein f is the ordinary frequency. $\varphi$ represents an initial phase of the output signal of the acceleration sensor in the X-axis direction, $g_x(k)$ represents an X-axis gravity acceleration signal without noise, and $n_x(k)$ represents various noise signals including random noise generated by the circuit, centrifugal acceleration generated by the rotation, vibration and shock interferences of the drilling tool, and the like.

The output signal of the acceleration sensor in the Y-axis direction has a 90-degree phase difference from the output signal of the acceleration sensor in the X-axis direction. Therefore, the initial phase of the output signal of the acceleration sensor in the Y axis direction is ($\varphi$−90) degrees, then:

$$\bar{g}_y(k) = \quad (2)$$
$$A_y\cos\left(\omega\times k\times T_s+\varphi-\frac{\pi}{2}\right)+n_y(k) = A_y\sin(\omega\times k\times T_s+\varphi)+n_y(k)$$

$$\bar{g}_y(k) = g_y(k)+n_y(k) \quad (3)$$

$g_y(k)$ represents a Y-axis gravity acceleration signal that includes noise signals. $A_y$ represents the amplitude of the signal from the accelerator installed along the Y-axis. $g_x(k)$ represents a Y axis gravity acceleration signal without noise, $n_y(k)$ represents various noise signals including the random noise generated by the circuit, the centrifugal acceleration generated by the rotation, the vibration and shock interferences of the drilling tool, and the like.

The digital acceleration signal acquired and generated by analog-to-digital converter requires temperature compensation, sensor scale factor and offset correction, installation error correction, etc.

(2) Magnetic Reference Signal Measurement

A magnetometer is installed in the measurement apparatus to serve as the reference measurement sensor, as the signals measured on the horizontal plane (X and Y directions) by the magnetometer are better, the sensitive axis of the magnetometer is installed parallel to the X-axis, the output thereof is used as the reference signal, and the normalized magnetometer signal is expressed as:

$$\bar{r}_x(k)=\cos(\omega\times k\times T_s)+n_2(k)=r_x(k)+n_r(k) \quad (4)$$

(3) Gravity Acceleration Extraction Method Through Correlation Detection

The signals measured by the X-axis and Y-axis accelerometers are processed based correlation detection with the reference signal measured by the magnetometer respectively, and cross-correlation operation is performed on the formula (1) and the formula (4) to obtain a cross-correlation result of the X axis acceleration and the reference signal measured by the magnetometer.

$$\bar{R}_{g_xr_x}(\tau) = \quad (5)$$
$$\frac{1}{N}\sum_{k=0}^{N-1}\bar{g}_x(k+\tau)\times\bar{r}_x(k) = R_{g_xr_x}(\tau)+R_{g_xn_r}(\tau)+R_{r_xn_x}(\tau)+R_{n_xn_r}(\tau)$$

In the formula (5), a sinusoidal signal is irrelevant to random noise, therefore $R_{g_xn_r}(\tau)$ and $R_{r_xn_x}(\tau)$ are zero; and because the magnetometer is insensitive to vibrating signals, the coherence between the random noise of the acceleration signal and the random noise of the magnetic reference signal is very weak, and thus $R_{n_x n_r}(\tau) \approx 0$.

$$\overline{R}_{g_x r_x}(\tau) = R_{g_x r_x}(\tau) = \frac{A_x}{2}\cos(\omega\tau + \varphi) \quad (6)$$

Similarly, the cross-correlation operation is performed on the formula (3) and the formula (4) to obtain a correlation signal of the Y-axis acceleration and the reference signal measured by the magnetometer.

$$\overline{R}_{g_y r_x}(\tau) = \quad (7)$$
$$\frac{1}{N}\sum_{k=0}^{N-1} \overline{g}_y(k+\tau) \times \overline{r}_x(k) = R_{g_y r_x}(\tau) + R_{g_y n_3}(\tau) + R_{r_x n_2}(\tau) + R_{n_2 n_3}(\tau)$$

$$\overline{R}_{g_y r_x}(\tau) = R_{g_y r_x}(\tau) = \frac{A_y}{2}\sin(\omega\tau + \varphi) \quad (8)$$

Comparing the formula (1) with the formula (6), we obtain:

$$g_x(t) = 2 \times \overline{R}_{g_x r_x}(t) = A_x \cos(\omega t + \varphi) \quad (9)$$

The formula (9) is the output signal of the acceleration sensor in the X-axis direction after the noise is removed.

Comparing the formula (2) with the formula (8), we obtain:

$$g_y(t) = 2 \times \overline{R}_{g_y r_x}(t) = A_y \sin(\omega t + \varphi) \quad (10)$$

The formula (10) is the output signal of the acceleration sensor in the Y-axis direction after the noise is removed. As the Z-axis is the rotating axis, in view of the fact that the acceleration of the Z-axis direction varies only when the inclination angle changes in the actual drilling process, and the inclination angle changes very slowly, and thus the acceleration signal of the Z-axis can be regarded as a direct current signal which changes very slowly, and the digital lowpass filter is designed in the microcontroller to further filter the vibration and shock interferences.

The gravity acceleration further obtained by the measurement method can be used for calculating the inclination angle and the toolface angle of the drilling tool.

(4) Method for Calculating the Inclination Angle and the Toolface Angle

The inclination angle is:

$$\theta = \arctan\left(\frac{\sqrt{g_x^2 + g_y^2}}{g_z}\right) = \arctan\left(2 \times \frac{\sqrt{\overline{R}_{g_x r_x}^2 + \overline{R}_{g_y r_x}^2}}{A_z}\right) \quad (11)$$

The toolface angle is:

$$\Phi = -\arctan\left(\frac{g_y}{g_x}\right) = -\arctan\left(\frac{\overline{R}_{g_y r_x}}{\overline{R}_{g_x r_x}}\right) \quad (12)$$

$g_z$ represents the Z-axis gravity acceleration signal subjected to digital lowpass filtering.

The invention claimed is:

1. A gravity acceleration measurement apparatus mounted on a drilling tool, comprising a measurement circuit, a three-axis gravity accelerometer, a magnetometer, and a temperature sensor,
   wherein, during operation, the three-axis gravity accelerometer measures acceleration component signals in three mutually orthogonal directions that are in an X-axis, a Y-axis, and a Z-axis, respectively,
   the magnetometer generates a reference signal that varies with rotation of the drilling tool,
   the temperature sensor measures a downhole temperature, and
   the measurement circuit is connected to and acquires output signals from the three-axis gravity accelerometer, the magnetometer, and the temperature sensor, and performs cross-correlation processing of the reference signal and the acceleration component signals compensated using the downhole temperature, and eliminates centrifugal acceleration, vibration, shock and noises generated by rotation to obtain non-interference gravity accelerations along the X-axis and the Y-axis, respectively, and
   wherein the magnetometer has a sensitive axis perpendicular to the Z-axis, wherein the Z-axis is the rotational axis of the drilling tool, and
   wherein an inclination angle of the drilling tool is:

$$\theta = \arctan\left(2 \times \frac{\sqrt{\overline{R}_{g_x r_x}^2 + \overline{R}_{g_y r_x}^2}}{A_z}\right)$$

and wherein the toolface angle of the drilling tool is:

$$\Phi = -\arctan\left(\frac{\overline{R}_{g_y r_x}}{\overline{R}_{g_x r_x}}\right)$$

wherein $\overline{R}_{g_x r_x}(\tau)$ is a cross-correlated signal between the reference signal and the gravity acceleration in the X-axis, and $$\overline{R}_{g_x r_x}(\tau) = \frac{Ax}{2}\cos(\omega\tau + \varphi),$$

$\overline{R}_{g_y r_x}(\tau)$ is the cross-correlated signal between the reference signal and the gravity acceleration in the Y-axis, and $$\overline{R}_{g_y r_x}(\tau) = \frac{Ay}{2}\sin(\omega\tau + \varphi),$$

wherein $A_x$ is the gravity acceleration in the X-axis, $A_y$ is the gravity acceleration in the Y-axis, $A_z$ is the gravity acceleration in the Z-axis, $\omega$ is a rotating angular frequency of the drilling tool, $\varphi$ is an initial phase of an output signal in the X-axis from the accelerometer.

2. The gravity acceleration measurement apparatus of claim 1, wherein the three-axis gravity accelerometer comprises a first gravity accelerometer installed in a first radial direction to the drilling tool along the X-axis, a second gravity accelerometer installed in a second radial direction along the Y-axis, a third gravity accelerometer installed along the Z-axis, wherein X-axis, Y-axis, and Z-axis satisfy a right-handed coordinate system, wherein the three-axis gravity accelerometer is connected with a lowpass filter, wherein, during operation, the lowpass filter performs analog filtering function to the output signals of the three-axis gravity accelerometer to remove frequency component from vibration and shock interference, the filtered signals are acquired by the measurement circuit, and a cut-off frequency of the lowpass filter is related to the frequency bandwidth of the three-axis gravity accelerometer and rotating speed of drilling tool.

3. The gravity acceleration measurement apparatus of claim 2, wherein the measurement circuit further comprises an analog-to-digital converter, a memory, a microcontroller, and a data interface, wherein the analog-to-digital converter is connected with the three-axis gravity accelerometer, the magnetometer, the temperature sensor and the microcontroller, the microcontroller is connected with the memory and the data interface, the lowpass filter is disposed between and connected with the analog-to-digital converter and the three-axis gravity accelerometer, wherein the analog-to-digital converter converts the filtered analog signals of the three-axis gravity accelerometer into digital signals in a format receivable by the microcontroller, wherein the memory is an EEPROM or a FLASH, and the memory stores temperature calibration coefficients, scale factors, offset parameters, and correction coefficients for installation error of the three-axis gravity accelerometer, wherein the microcontroller performs calculations according to an algorithm to obtain the non-interference gravity acceleration, and the data interface is used for inputting and outputting data.

4. The gravity acceleration measurement apparatus of claim 3, wherein the microcontroller comprises a digital filter for filtering out an interference component of the Z-axis gravity accelerometer caused by vibration and shock.

5. The gravity acceleration measurement apparatus of claim 4, wherein the three-axis gravity accelerometer is a quartz flexible accelerometer or a MEMS accelerometer.

6. The gravity acceleration measurement apparatus of claim 1, wherein the three-axis gravity accelerometer is a quartz flexible accelerometer or a MEMS accelerometer.

7. A gravity acceleration measurement and extraction method using the apparatus according to claim 1, comprising: respectively measuring axial Z-axis and radial X-axis, Y-axis gravity accelerations of a drilling tool by using the three-axis acceleration sensor, and generating a signal that varies with rotation and is not affected by vibration or shock to serve as a reference signal by using the magnetometer; measuring the temperature in the apparatus by using the temperature sensor, and performing temperature compensation on the gravity accelerometers; acquiring the output signals of the three-axis gravity accelerometer, the magnetometer and the temperature sensor by a measurement circuit, performing cross-correlation between the X-axis gravity acceleration, the Y-axis gravity acceleration measured by the three-axis gravity accelerometer and the normalized reference signal to eliminate the X-axis and Y-axis interference components generated by vibration and shock; and filtering the interference component measured by the Z-axis gravity accelerometer using the digital lowpass filter in the microcontroller, and obtaining a three-axis gravity acceleration in the rotating state with the influence of the vibration and shock eliminated.

8. The gravity acceleration measurement and extraction method of claim 7, wherein the method employs the apparatus according to claim 2.

9. The gravity acceleration measurement and extraction method of claim 7, wherein the method employs the apparatus according to claim 1.

10. A gravity acceleration measurement and extraction method, wherein the method employs the apparatus according to claim 1.

11. The gravity acceleration measurement and extraction method of claim 1, wherein the gravity acceleration obtained by the method is used for calculating an inclination angle and a toolface angle in the rotating state.

\* \* \* \* \*